(12) United States Patent
Lichtenberg et al.

(10) Patent No.: US 6,551,007 B2
(45) Date of Patent: Apr. 22, 2003

(54) JOINT FOR CONNECTING WOOD MEMBERS

(75) Inventors: Gary J. Lichtenberg, Madison, WI (US); John R. Erickson, Madison, WI (US); Robert Ross, Madison, WI (US); Dwight Flach, Madison, WI (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/892,236

(22) Filed: Jun. 28, 2001

(65) Prior Publication Data

US 2002/0034416 A1 Mar. 21, 2002

Related U.S. Application Data

(60) Provisional application No. 60/222,175, filed on Aug. 1, 2000, and provisional application No. 60/222,210, filed on Aug. 1, 2000.

(51) Int. Cl.[7] .................................................. F41B 5/02
(52) U.S. Cl. ....................... 403/270; 403/272; 403/268; 273/416
(58) Field of Search ................................ 403/270, 271, 403/272, 267, 268

(56) References Cited

U.S. PATENT DOCUMENTS

| 1,394,137 A | * 10/1921 | Blair ..................... 403/268 X |
|---|---|---|
| 4,274,756 A | 6/1981 | Lange |
| 4,305,588 A | * 12/1981 | Dodge ................... 403/268 X |
| 4,492,489 A | 1/1985 | Kantorowich |
| 4,493,582 A | * 1/1985 | Drabsch ................. 403/267 X |
| 4,981,388 A | 1/1991 | Becken et al. |
| 5,499,667 A | 3/1996 | Nakanishi |
| 5,636,934 A | 6/1997 | Nakanishi et al. |
| 5,985,415 A | 11/1999 | Giltner |
| 6,041,837 A | 3/2000 | Hanson |

OTHER PUBLICATIONS

"Traditional Archery" by Doug Besherse website http://domino.htcomp.net/bhn/Columnists.nsf/d731dec9a6178218862565900006 46df/d4f89e807155f5b28625661300748ec2?OpenDocument, Aug. 29, 1999.*

* cited by examiner

Primary Examiner—Lynne H. Browne
Assistant Examiner—John Cottingham
(74) Attorney, Agent, or Firm—John D. Fado; Janet I. Stockhausen

(57) ABSTRACT

A self-centering and self-aligning joint is presented for bonding a first and second wood segment, wherein the joint includes a single tenon extending from the end face of the first segment, and a void disposed within the end face of the second segment. And adhesive is applied to the outer surface of the tenon, or to the inner surface of the void to join the two segments.

13 Claims, 3 Drawing Sheets

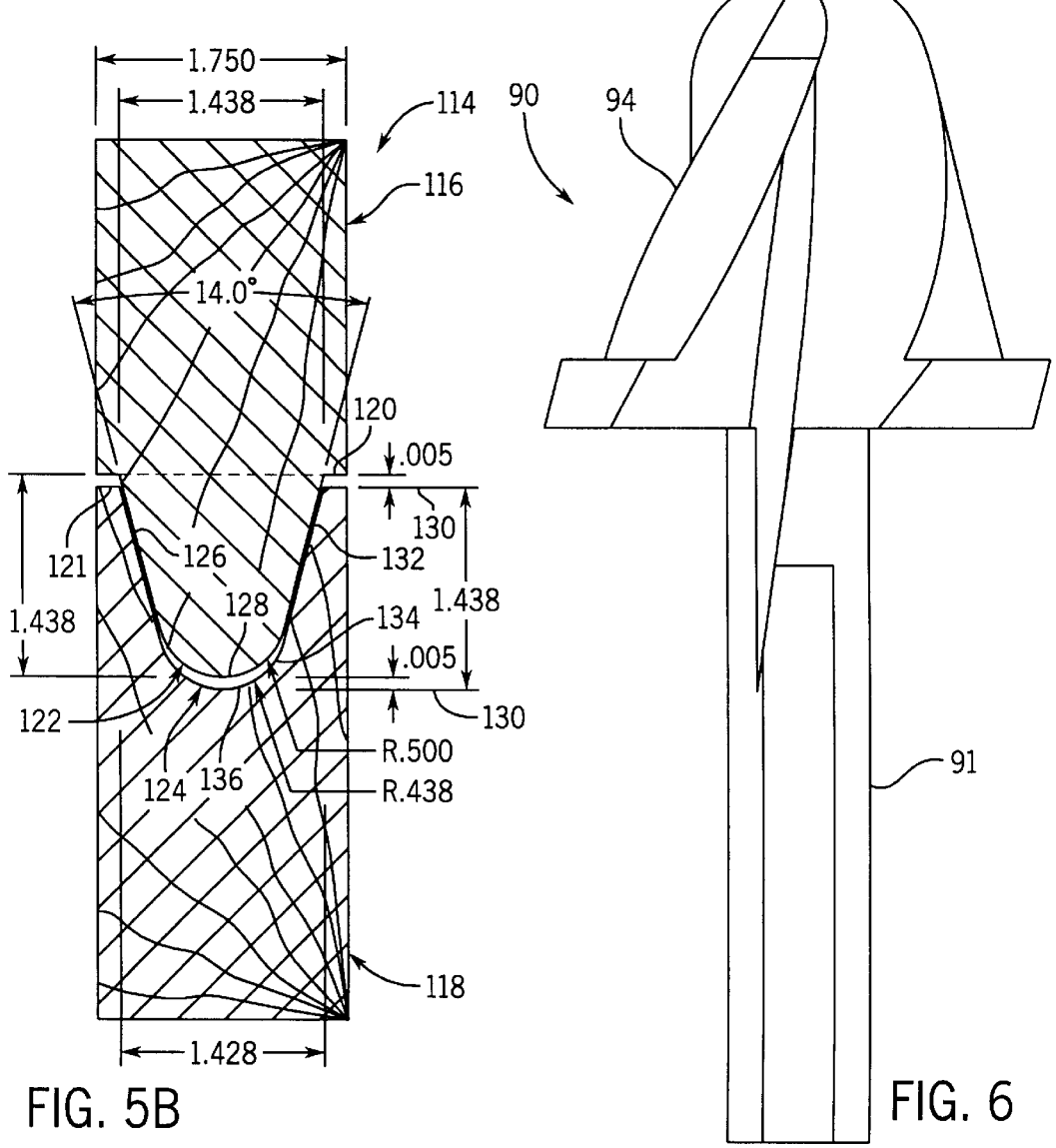

JOINT FOR CONNECTING WOOD MEMBERS

CROSS-REFERENCE TO RELATED APPLICATIONS

This application claims priority to provisional patent application U.S. Ser. No. 60/222,175, entitled "Small Diameter Concentric Finger Joint" and filed on Aug. 1, 2000, and further claims priority to provisional application U.S. Ser. No. 60/222,210, entitled "Improved Finger-Joint in Finger Jointed Lumber" and filed on Aug. 1, 2000, the disclosures of which are hereby incorporated by reference as if set forth in their entirety herein.

STATEMENT REGARDING FEDERALLY SPONSORED RESEARCH OR DEVELOPMENT

BACKGROUND OF THE INVENTION

The present invention relates generally to jointed timber, and in particular, related to an improved joint for connecting a first and second wood segment to produce a finished unitary wood product.

When end-joining two segments of timber to produce a finished wood product, it is desirable to produce a joint having sufficient strength and desirable aesthetic characteristics. Conventional end joints for timber include a plurality of fingers that extend outwardly from the end faces of the two segments of timber that are to be joined. In particular, the fingers may either extend linearly across the end face, or may be separated from one another in both the first and second dimensions defining the face. The fingers are of equal length, and intermeshed such that the addition of adhesive within the joint bonds the two segments together. This type of joint is described, for example, in U.S. Pat. No. 5,985,415.

While such joints have been shown to be relatively effective for wood segments having a square or rectangular cross section, their effectiveness is greatly reduced when joining timber segments having a round cross section. For example, when traditional finger joints are used to join the rounded ends of two timber segments, poor strength characteristics have resulted, thereby facilitating premature failure of the joint. The deficiencies in bonding strength are exacerbated when joining two round timber segments having a relatively small diameter that inherently presents a reduced bonding surface area. Furthermore, conventional finger joints present a reduced bonding area near the outer periphery of the round cross section, which is where the stresses experienced by the joint are typically greatest. As a result, finger joints are unacceptable when fabricating tool handles, which typically experience high stresses during normal operation.

The weak bond that is produced by conventional joints applied to round wood segments is further incapable of providing a reliable joint for low-grade timber. Accordingly, excess volumes of low-grade timber remain unharvested in the forest. This constitutes a waste of a potentially valuable resource, and additionally presents a greater potential for overly intense forest fires. Furthermore, conventional finger joints applied to timber having round cross sections produce jagged and aesthetically displeasing joint lines that often include visible glue lines. Therefore, finger joints are often only used for surfaces that will be painted, which is not acceptable for many end use applications that are stained or varnished, such as stair banisters.

Another disadvantage associated with conventional finger joints is the difficulty associated with their fabrication. The finger joints must be manufactured within tight tolerance to ensure that the two end faces are properly aligned when the joint is assembled. Furthermore, complex tooling is required to producing a plurality of fingers in each end face in both the first and second dimensions of the end face, adding expense to the fabrication process.

What is therefore needed is a joint for connecting two timber segments having a round cross section that has improved strength characteristics, and that produces an aesthetically appealing joint.

BRIEF SUMMARY OF THE INVENTION

The present invention recognizes that a joint may be produced that has enhanced strength and aesthetic qualities, is self-aligning, and is easier and less expensive to produce compared to conventional joints.

In accordance with one aspect of the invention, a joint for bonding a first axially extending wood segment presenting a first end face to a second axially extending wood segment presenting a second end face comprises 1) a single protrusion extending axially outwardly from the first end face and centered on the first end face, 2) a single void defined by an inner wall of the second wood segment, wherein the void extends axially inwardly from second end face and is centered with respect to the second end face, and wherein the void is sized to receive the protrusion therein, and 3) an adhesive disposed at an interface between the protrusion and the inner wall of the second wood segment to join the first and second wood segments together.

This and other aspects of the invention are not intended to define the scope of the invention for which purpose claims are provided. In the following description, reference is made to the accompanying drawings, which form a part hereof, and in which there is shown by way of illustration, and not limitation, preferred embodiments of the invention. Such embodiments do not define the scope of the invention and reference must therefore be made to the claims for this purpose.

BRIEF DESCRIPTION OF THE DRAWINGS

Reference is hereby made to the following figures in which like reference numerals correspond to like elements throughout, and in which:

FIG. 5B is a sectional side elevation view of a unitary wood product formed from wood segments joined in accordance with the preferred embodiment using the tooling illustrated in FIG. 5A.

FIG. 6 is a side elevation view of the male cutter illustrated in FIG. 5A.

DETAILED DESCRIPTION OF THE INVENTION

Figure 1:
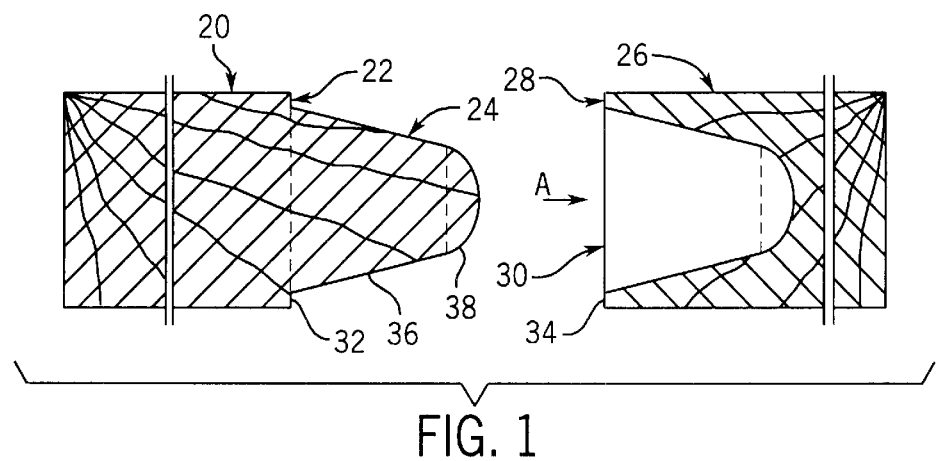
FIG. 1 is a sectional side elevation view of two wooden segments to be joined in accordance with the present invention.

Referring initially to FIG. 1, a first wood segment 20 includes an end face 22 having a single tenon 24 protruding outwardly therefrom. In particular, tenon 24 is substantially symmetrical about a central line extending through and bisecting the center of wood segment 20 perpendicular to end face 22. A second wood segment 26 includes an end face 28 having a single void 30 disposed therein that is sized to receive the tenon 24 therein. Void, or socket, 30 is generally symmetrical about the center line extending axially through and bisecting segment 26 perpendicular to end face 28. Adhesive is applied to the tenon 24 and/or void to bond the two segments 20 and 26 together when held under pressure. In particular, tenon 24 is inserted into the socket 30 in the direction of arrow "A" such that the wood segments 20 and 26 become aligned, and the resulting joint is self-centered, as will be described in more detail below. The resulting joint presents a greater surface area that is joined compared to the bonding of two flat surfaces, thereby producing a stronger bond. While first and second wood segments 20 and 26, respectively, are described herein as having a round cross-section, it should be appreciated that they may comprise any configuration whatsoever that is capable of having a tenons 24 and sockets 30 formed in their respective end faces. For example, the segments 20 and 26 may have an oval or rectangular cross-section.

It should be further appreciated that tenon 24 and socket 30 may comprise one of many geometrical shapes such that the void is operable to receive the tenon therein to join the two wood segments. In accordance with the preferred embodiment, the mouth of tenon 24 does not span the entire width of end face 22, but rather sits on an outer annular flange 32 that circumscribes the base of tenon 24. Correspondingly, mouth of socket 30 is defined by outer lips 34 that abut flange 32 when the wood segments 20 and 26 are joined. As a result, a smooth joint line is produced when the two segments are bonded. Tenon 24 is an annular member whose mouth has a diameter that decreases as the distance from end face 22 increases, thereby producing a frusto-conical base member 36. Tenon 24 further includes an outer member 38 comprising an arc that is disclosed at the outermost surface of base member 36. Socket 30 has substantially the same size and shape of tenon 24 to ensure that the resulting joint is aligned and centered. Furthermore, the mouth of socket 30 is significantly wider than the outer arc 38 of tenon 24. As a result, tenon 24 may be easily inserted into void 30, and as the tenon is further inserted, the walls of base member 36 are guided by the side walls that define socket 30 such that the joint is self-aligning. Accordingly, the joint in accordance with the preferred embodiment is easy to assemble.

Figure 2:
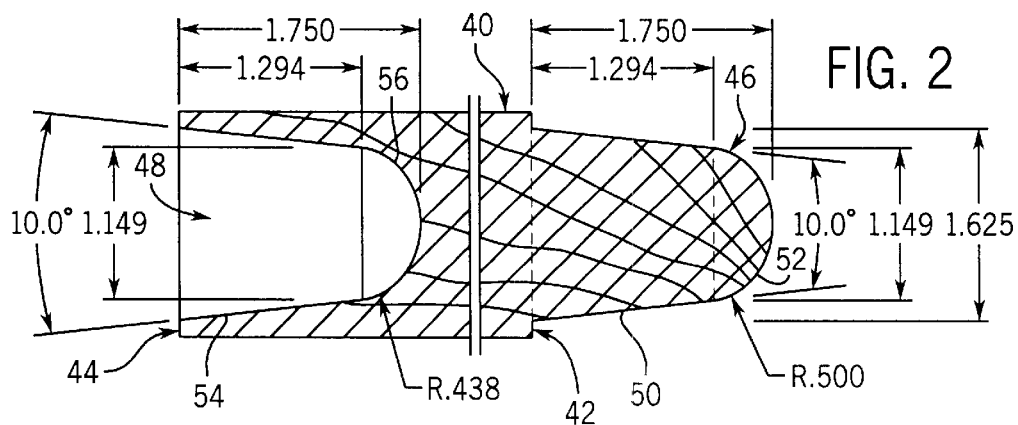
FIG. 2 is a sectional side elevation view of a wood segment including first and second end faces presenting concave and convex mating surfaces constructed in accordance with a preferred embodiment of the invention.
Figure 3:
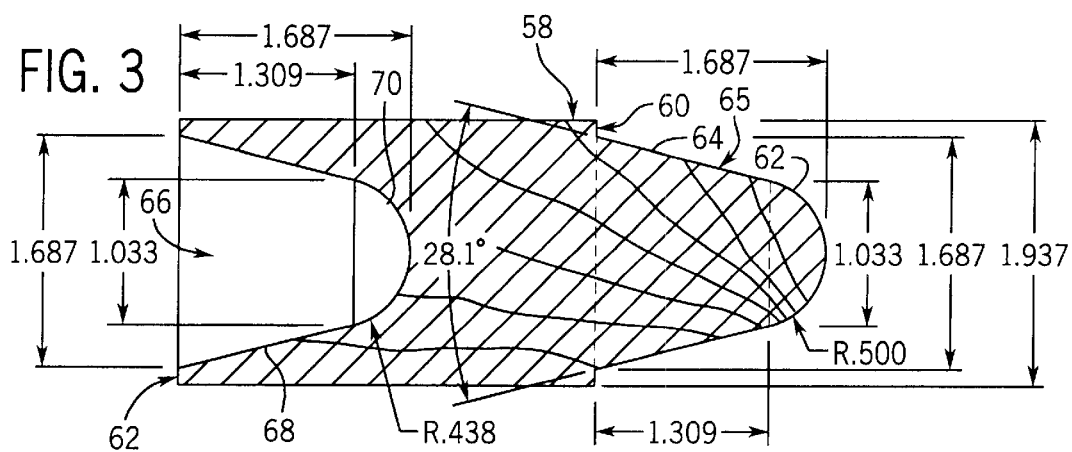
FIG. 3 is a sectional side elevation view of a wood segment including first and second end faces presenting concave and convex mating surfaces constructed in accordance with a preferred embodiment of the invention.
Figure 4:
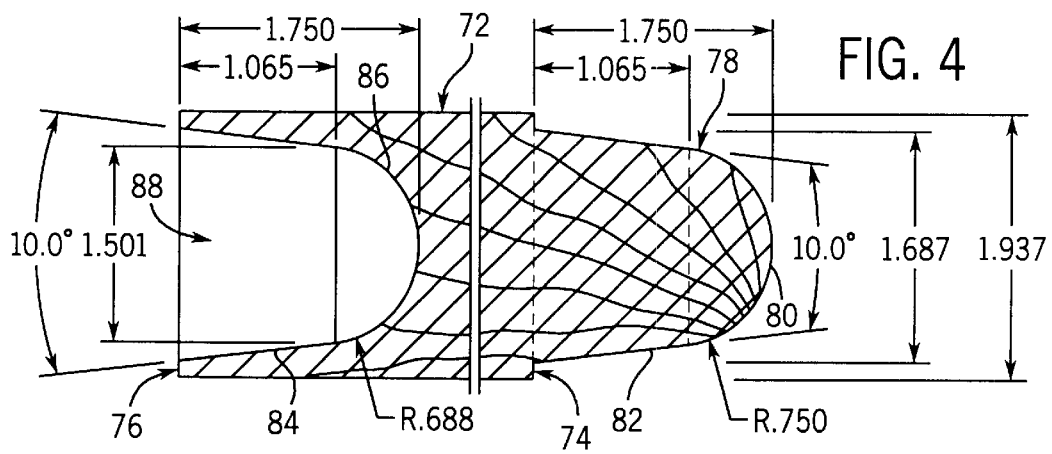
FIG. 4 is a sectional side elevation view of a wood segment including first and second end faces presenting concave and convex mating surfaces constructed in accordance with a preferred embodiment of the invention.

It is appreciated from FIGS. 2–4 that the tenon 24 and socket 30 may be constructed having various geometrical configurations. While preferred geometries are illustrated, it should be appreciated to those having ordinary skill in the art that any suitable configuration may be used in accordance with the present invention that allows a single tenon of a first wood segment to be received by a corresponding socket of a second wood segment to produce an aligned and centered joint. For example, the socket 30 and tenon 24 may be oval or rectangular-shaped in cross section instead of circular as illustrated in accordance with the preferred embodiment. The dimensions of the illustrated embodiments are shown for to illustrate various embodiments of the invention, it being understood that these dimensions may differ greatly from one application to another without departing from the present invention.

Referring now to FIG. 2 in particular, the dimensions in inches are specified for a single wood segment 40 extending in an axial direction and including first and second oppositely disposed end faces 42 and 44, respectively, that extend radially. Segment 40 is usable as an intermediate wood segment connecting two other wood segments at its opposing two end faces 42 and 44. A tenon 46 protrudes outwardly from first end face 42, and a socket 48 is formed within second end face 44. In particular, the dimensions of wood segment 20 are illustrated such that the tenon 46 would be received by a socket of a corresponding wood segment having the dimensions of socket 48 illustrated in FIG. 2. Correspondingly, socket 48 would receive a tenon of a mating wood segment having the dimensions of tenon 46. Of course, if segment 40 is to be used as an end segment of a finished wood product, the exposed end face would not include the tenon 46 or socket 48.

The wood segment as illustrated has an outer diameter of 1.625 inches. It should be appreciated that, while wood segment 40 is annular in accordance with the preferred embodiment, it may be rectangular, or possess any alternative geometric configuration operable to form tenon 46 and/or socket 48 in its end face. As described above, tenon 46 includes an inner frusto-conical base member 50 integrally connected to an arc-shaped outer tip 52. The side walls of base member 50 form a 10 degree angle with respect to the axial direction. In accordance with the illustrated embodiment, the tenon has an overall axial length of 1.75 inches, while the axial length of frusto-conical base member 50 is 1.294 inches. The diameter of the tenon 46 at the tip of base member 50, which is also the base of tip 56, is 1.149 inches. The tip 56 is formed from an arc of a sphere having a radius of 0.5 inch.

Socket 48 has dimensions similar to those of tenon 46, and includes an outer frusto-conical base member 54 and an arch-shaped inner tip 56 that are configured to receive therein a tenon including the base member 50 and tip 52 of tenon 46. In particular, the overall axial length of socket 48 1.75 inches, and base member 54 has an axial length of 1.294 inches. The diameter of socket 48 at the tip of base member 50 is 1.149 inches. The outer walls defining base member 68 form a 10° angle with respect to the axial direction. The only dimension of the socket 48 not corresponding to the tenon is the radius that defines tip 56. Specifically, tip 56 is formed from an arc of a sphere having a radius of 0.438 inches, as opposed to the 0.5 inch corresponding to tip 52 of tenon 46. As a result, and as will be illustrated in more detail below, tenon 46 is self-aligned and centered within a corresponding socket such that a gap between the corresponding walls of the tenon and socket 48. This gap provides a void that will be occupied by the adhesive that is used to bond the wood segments. As a result, the gap minimizes adhesive squeeze-out during assembly.

Referring now to FIG. 3, a wood segment 58 includes first and second end faces 60 and 62, respectively, having a corresponding tenon 65 and socket 66 constructed in accordance with an alternate embodiment of the invention. In particular, while the geometry in accordance with this embodiment is structurally similar to the embodiment illustrated in FIG. 2, the dimensions of the corresponding elements differ. For example, the outer diameter of segment 58 is 1.937 inches. The overall axial length of tenon 65 is 1.687 inches and the axial length of base member 64 is 1.309 inches. The side walls of base member 64 form a 28.1 degree angle with respect to the axial direction. The diameter of the tenon 65 at the tip of base member 64, which is also the base of tip 62, is 1.033 inches. The tip 62 is formed from an arc of a sphere having a radius of 0.5 inch.

Socket 66 has dimensions similar to those of tenon 65, and includes an outer frusto-conical base member 68 and an arch-shaped inner tip 70 that are configured to receive therein a tenon including the base member 64 and tip 62 of tenon 65. In particular, the overall axial length of socket 66 is 1.687 inches, and base member 68 has an axial length of 1.309 inches. The diameter of socket 66 at the tip of base member 68 is 1.033 inches. The side walls of base member 68 form an angle of 28.1 degrees with respect to the axial direction. The only dimension of the socket 66 not corresponding to tenon 65 is the radius that defines the tip 70. Specifically, tip 70 is formed from an arc of a sphere having a radius of 0.438 inches. As a result, as described above, an adhesive-absorbing gap is produced when a socket and tenon having these dimensions are bonded.

Referring now to FIG. 4, a wood segment 72 includes first and second end faces 74 and 76, respectively, having a corresponding tenon 78 and socket 88 constructed in accordance with an alternate embodiment of the invention. In particular, while the geometry in accordance with this embodiment is structurally similar to the embodiments illustrated in FIGS. 2 and 3, the dimensions of the corresponding elements differ. For example, the outer diameter of wood segment 72 is 1.937 inches, as is also illustrated in FIG. 3. The overall axial length of tenon 78 is 1.75 inches and the axial length of base member 82 is 1.065 inches. The side walls of base member 82 form a 10° angle with respect to the axial direction. The diameter of the tenon 78 at the tip of base member 82, which is also the base of tip 80, is 1.687 inches. The tip 80 is formed from an arc of a sphere having a radius of 0.75 inch.

Socket 88 has dimensions similar to those of tenon 78, and includes an outer frusto-conical base member 84 and an arch-shaped inner tip 86 that are configured to receive therein a tenon having the dimensions of base member 82 and tip 80 of tenon 78. In particular, the overall axial length of socket 88 is 1.75 inches, and base member 84 has an axial length of 1.065 inches. The diameter of socket 88 at the tip of base member 84 is 1.501 inches. The side walls of base member 84 form an angle of 10° with respect to the axial direction. The only dimension of the socket 88 not corresponding to tenon 78 is the radius that defines the tip 86. Specifically, tip 86 is formed from an arc of a sphere having a radius of 0.688 inches which, again, is slightly smaller than the radius that defines tip 80 of tenon 78. Accordingly, as described above, adhesive squeeze-out is minimized during assembly.

Figure 5A:
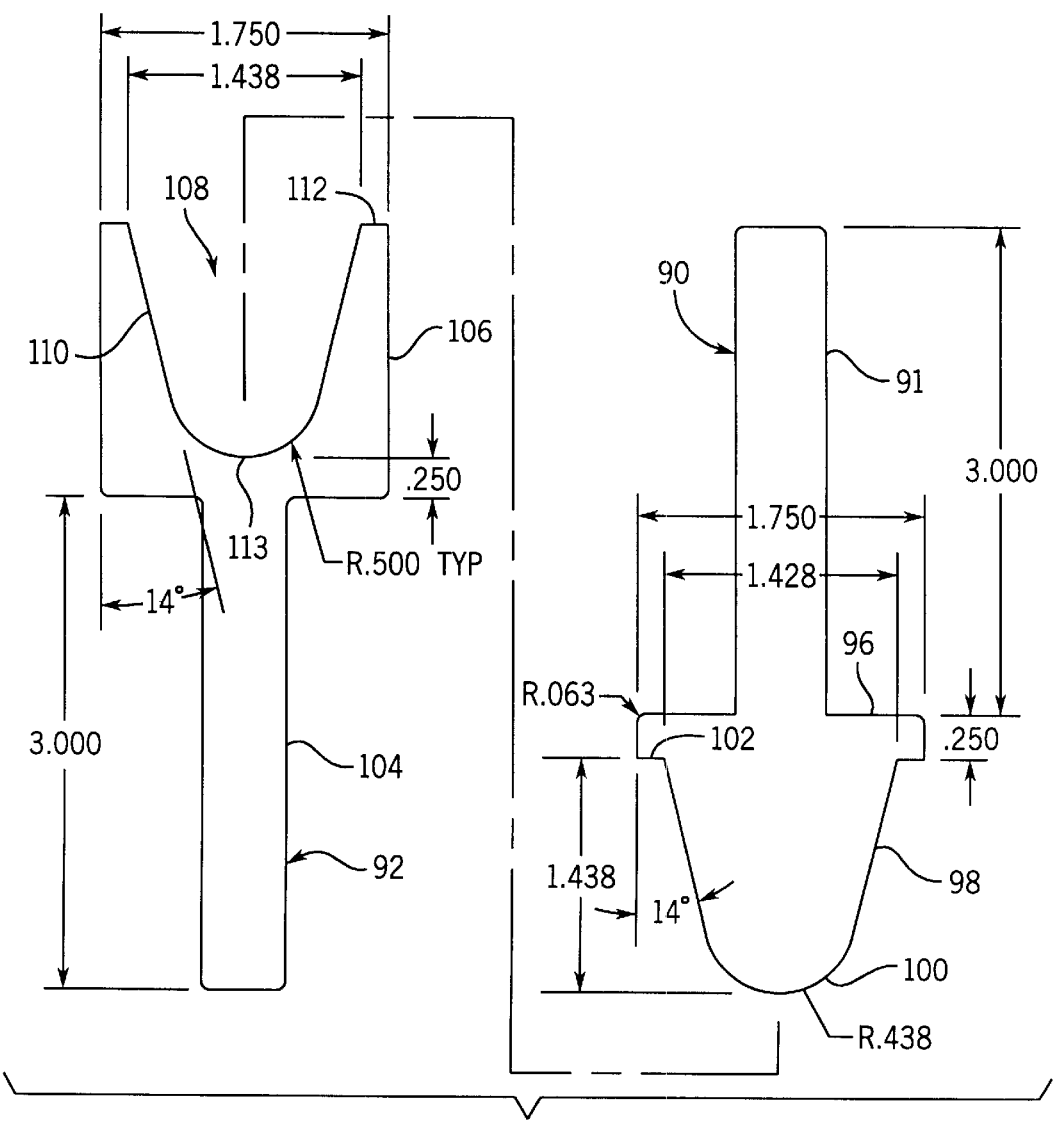
FIG. 5A is a side elevation view of the tooling used to produce the joint in accordance with the preferred embodiment of the invention.

Referring now to FIG. 5A, an axially extending male and female cutter 90 and 92 are schematically illustrated for producing sockets and tenons, respectively, in accordance with the preferred embodiment, having dimensions that are configured to produce a gap between the mating surfaces as described above. The cutters 90 and 92 may comprise any suitable material having properties suitable for forming the joint, and may include a plurality of helical flutes 94 to aid in wood chip removal during fabrication, as illustrated with reference to the male cutter in FIG. 6. While the dimensions of the cutters 90 and 92 are illustrated in FIG. 5, it should be appreciated that any suitable dimensions may be used that are sufficient to produce a tenon and corresponding socket, as described above.

Male cutter 90 includes a 3 inch long shank 91, which may include three flats to prevent rotation if a chuck is used rather than a collet. Cutter 90 further includes an annular shoulder 96 integrally connected to a frusto-conical member 98 having an arc-shaped end 100 protruding outwardly therefrom that is configured to bore into an end face of a wood segment to produce socket 30. Frusto-conical member 98 sits on base 96 such that an outer flange 102 circumscribes member 98 and produces outer lips 34 illustrated in FIG. 1. The base member 96 has a diameter of 1.75 inches and a length of 0.25 inches, and member 98 has a diameter of 1.428 inches at its mouth. The axial length of members 98 and 100 combined is 1.438 inches, and the walls defining member 98 form a 14° angle with respect to the axial direction. End 100 is formed from an arc of a sphere having a radius of 0.438 inches.

The female cutter 92 includes a 3 inch long shank 104 having an annular member 106 that is configured to cut into an end face of a wood segment to produce a tenon 24. Member 106 includes a flange 112 that defines the mouth of a void 108 defined by a frusto-conical wall 110 and an arc-shaped end 113. The dimensions if female cutter 92 are similar to those defining male cutter 90, except that end 113 is formed from a sphere having a radius of 0.5 inches.

Referring now to FIG. 5B, a unitary wood product 114 extending in an axial direction is formed from two wood segments 116 and 118 joined in accordance with the preferred embodiment using the tooling illustrated in FIG. 5A. In particular, segment 116 includes an end face 120 having a responding tenon 122 protruding therefrom, and segment 118 has a socket 124 formed therein. It will be appreciated that tenon 122 and socket 124 have dimensions corresponding to the dimensions of the female and male cutters 92 and 90, respectively.

For example, the outer diameter of wood product 116 is 1.750 inches. The overall axial length of tenon 122 is 1.438 inches, which includes frusto-conical base member 126 and arc-shaped end 128. End 128 is formed from a sphere having a radius of 0.5 inches. The side walls of base member 126 form a 14° angle with respect to the axial direction, and the diameter of the tenon 122 adjacent the end face 120 is 1.438 inches. It will be appreciated from the description of the socket 124 that the radius corresponding to end 120 as well as the diameter of tenon 122 adjacent end face 120 differs from the corresponding portion of the socket, thereby producing a gap 130 therebetween. As described above, the gap may be filled with adhesive that bonds the two segments 116 and 118 together such that minimal adhesive leakage is experienced with assembling wood product 114.

The outer diameter of wood segment 118 is also 1.750 inches, which includes an outer frusto-conical member 132 and an arc-shaped inner tip 134 formed within an end face 121 that are configured to receive tenon. The overall axial length of socket 88 is 1.438 inches, and the side wall forming base member 132 forms a 14° angle with respect to the axial direction, corresponding to tenon 122. The diameter of socket at the mouth of member 132 is 1.428 inches, and the arc shaped inner tip 134 is formed from a sphere having a radius of 0.438 inches. Because the diameter of the mouth is less than the diameter of tenon 122 adjacent end face 120, a the gap 130 is produced at the interface between end faces 120 and 121. Additionally, because the radius corresponding to end 128 is larger than the radius corresponding to end 134, a second gap 136 is produced at the interface between ends 128 and 134. Both gaps 130 and 136 provide a pocket within the joint to retain the adhesive that is used to bond segments 116 and 118.

It should thus be appreciated that the single tenon and socket are easier to manufacture than conventional methods that employ a plurality of intermeshing fingers to end-join two segments of timber. Because fewer intermeshing parts are present in accordance with this invention, the frequency of errors in alignment due to tolerance in manufacturing is greatly reduced. Additionally, the joint is self-aligning and merely requires the insertion of a tenon into a socket under pressure rather than the alignment of a plurality of individual fingers and corresponding recesses.

The strength of wood products that were fabricated from two segments joined using the tenon-and-socket relationship in accordance with the present invention were tested. In particular, a tensile force was applied to maple and ash wood products and the strength of the joint, in PSI, was determined. The results, illustrated below in Table 1 illustrate the superior strength of the resulting joint given the fact that no attempt was made to optimize the performance of the adhesive used during these tests. An average strength value is set forth for each species, followed by the range obtained from several samples. Those having ordinary skill in the art appreciate that the performance of the joint would be much improved by optimizing the pH, buffering capacity, viscosity, and cure rate of the adhesive.

TABLE 1

| Wood Species | Average Joint Strength (PSI) | Range of Joint Strength (PSI) |
| --- | --- | --- |
| Maple | 11,000 | 8,400–16,700 |
|  | 9,328 | 6,000–14,000 |

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention as set forth by the appended claims.

We claim:

1. A joint for bonding a first axially extending wood segment presenting a first end face to a second axially extending wood segment presenting a second end face, the joint comprising:
   a single protrusion extending axially outwardly from the first end face and centered on the first end face, said protrusion having a smooth surface;
   a single void defined by an inner wall of the second wood segment, wherein the void has a smooth surface, extends axially inwardly from the second end face and is centered with respect to the second end face, and wherein the void is sized to receive the protrusion therein; and
   an adhesive disposed at an interface between the protrusion and the inner wall of the second wood segment to join the first and second wood segments together.

2. The joint as recited in claim 1, wherein the protrusion comprises a frusto-conical member disposed proximal the first end face and an arc-shaped tip integrally connected to a distal surface of the frusto-conical member.

3. The joint as recited in claim 2, wherein the void further comprises a frusto-conical void disposed proximal the second end face and an arc-shaped void integral with frusto-conical void and disposed adjacent a distal surface of the frusto-conical void.

4. The joint as recited in claim 3, wherein the frusto-conical member has a mouth of a diameter smaller than the mouth of the frusto-conical void to produce a first gap disposed at the interface between the first and second end faces.

5. The joint as recited in claim 4, wherein the adhesive comprises a liquid adhesive prior to curing that is disposed in the first gap to bond the first and second wood segments.

6. The joint as recited in claim 3, wherein the arc-shaped tip and the arc-shaped void is formed from a first and second sphere, respectively, and wherein the first sphere has a radius greater than the second sphere to produce a gap disposed adjacent an interface between the arc-shaped tip and the inner wall of the second wood segment.

7. The joint as recited in claim 6, wherein the second gap forms a pocket sized to receive the adhesive that bonds the first and second wood segments.

8. The joint as recited in claim 7, wherein the adhesive is a liquid adhesive prior to curing.

9. The joint as recited in claim 3, wherein frusto-conical member and the frusto-conical void present outer walls that form the same angle with respect to the axial direction.

10. The joint as recited in claim 1, wherein the first and second wood segments have one of a round, oval, and rectangular cross-section.

11. A method for producing a joint operable to bond a first axially extending wood segment presenting a first end face to a second axially extending wood segment presenting a second end face, the method comprising the steps of:
   (a) forming a single protrusion with a smooth surface that extends axially outwardly from the first end face and centered on the first end face;
   (b) forming a single void defined by an inner wall of the second wood segment, wherein the void has a smooth surface and extends axially inwardly from second end face and is centered with respect to the second end face, and wherein the void is sized to receive the protrusion therein; and
   (c) depositing an adhesive at an interface between the protrusion and the inner wall of the second wood segment to join the first and second wood segments together.

12. The method as recited in claim 11, wherein step (a) is performed using a cutter presenting at least one helical flute disposed on its outer surface.

13. The method as recited in claim 11, wherein step (b) is performed using a cutter presenting at least one helical flute disposed on its outer surface.

* * * * *